United States Patent [19]

Yoshida

[11] Patent Number: 5,347,516
[45] Date of Patent: Sep. 13, 1994

[54] SYSTEM FOR ACCESS FROM LAN TO ISDN WITH MEANS FOR CHANGING BETWEEN USE OF PACKET SWITCH AND LINE SWITCH WITHOUT INTERRUPTION OF DATA TRANSMISSION

[75] Inventor: Atsushi Yoshida, Tokyo, Japan

[73] Assignee: NEC Corporation, Japan

[21] Appl. No.: 131,858

[22] Filed: Oct. 4, 1993

Related U.S. Application Data

[63] Continuation of Ser. No. 868,722, Apr. 14, 1992, abandoned.

[30] Foreign Application Priority Data

Apr. 14, 1991 [JP] Japan .................................. 3-082695

[51] Int. Cl.$^5$ .............................................. H04J 3/24
[52] U.S. Cl. ................................ 370/94.1; 370/85.13; 370/110.1
[58] Field of Search ...................... 370/94.1, 60, 110.1, 370/58.1, 85.13, 60.1, 85.1

[56] References Cited

U.S. PATENT DOCUMENTS

| | | | |
|---|---|---|---|
| 5,157,662 | 10/1992 | Tadamura et al. | 370/110.1 |
| 5,182,748 | 1/1993 | Sakata et al. | 370/94.1 |
| 5,184,345 | 2/1993 | Sahni | 370/110.1 |

Primary Examiner—Douglas W. Olms
Assistant Examiner—Shick Hom
Attorney, Agent, or Firm—Ostrolenk, Faber, Gerb & Soffen

[57] ABSTRACT

In access to the ISDN from LAN, two $B_1$ and $B_2$ channels in the TDM signal in the ISDN are predetermined to be corresponding to the packet and the line switches in the ISDN switch. The packet data from LAN are transmitted through a virtual circuit on $B_1$ channel through the packet switch to a called party under the call control on D channel. When the data packet from the LAN per a unit time is increased, another virtual circuit is set up on $B_2$ channel through the line switch by a call control on D channel in response to a channel change signal. Then, the virtual circuit on $B_1$ channel is cleared. Thus, the increased packet data is transmitted on $B_2$ channel and through the line switch to the called party without interruption of data transmission.

7 Claims, 4 Drawing Sheets

SYSTEM FOR ACCESS FROM LAN TO ISDN WITH MEANS FOR CHANGING BETWEEN USE OF PACKET SWITCH AND LINE SWITCH WITHOUT INTERRUPTION OF DATA TRANSMISSION

This is a continuation of application Ser. No. 07/868,722, filed on Apr. 14, 1992 now abandoned.

BACKGROUND OF THE INVENTION

The present invention relates to a system for access to an ISDN (Integrated Services Digital Network) from a packet data handling system such as a packet data terminal, a LAN (Local Area Network) or the like.

In the ISDN system, a digital subscriber line (DSL) extends from an exchanging office to a user's area. The DSL terminates to a network termination (NT) unit. A plurality of terminal equipments (TEs) are connected to the NT unit and are, therefore, connected to the DSL through the NT unit. As TEs, there are known a digital telephone set or sets (shich will only be called telephone sets hereinafter), a facsimile set or sets, a personal computer set or computer sets, and the like.

The CCITT (International Telegraph and Telephone Consultative Communication) recommendations I series prescribes protocol of user-network connection or interface in connection with seven classified layers which are numbered by 1 through 7. For example, layer 1 is directed to physical connecting conditions such as transmission rate, number of pins on connectors and others, layer 2 being for data link, layer 3 for call control from a call setup to call release completion.

According to the I series, communication information and control signals are transmitted through different channels which are multiplexed in a time division fashion as a time division multiplex (TDM) signal. The TDM signal comprises two communication information channels of a transmission rate of 64 kbps which are separately called B1 and B2 channels and a single control channel of a transmission rate of 16 kbps which is called D channel.

When the user has a LAN, it is often required to access to the ISDN from the LAN. In a conventional system for access from the LAN to the ISDN, a virtual circuit is set up on a particular one of B1 and B2 channels through the packet switch between the ISDN access system and a called party by the data link establishment and the call control on the D channel in response to a call request from the LAN. Then, packet data from the LAN are converted in protocol at a gateway circuit and are, thereafter, transmitted through the virtual circuit to the called party. The virtual circuit is maintained until disconnection or clear request is generated from the LAN.

Use of the packet switch in the virtual circuit is economical when a small number of data packets are transmitted for a unit time, but degrades throughput of the data when an increased number of data packets are transmitted for a unit time.

By indicating the line switch in the call control in response to the call request, the virtual circuit can be set up through the line switch. Use of the line switch improves the throughput of the data but is not economical when a decreased number of data packets are transmitted for a unit time.

In response to increase and decrease of number of data packets to be transmitted for a unit time, it is possible to clear a current virtual circuit using one of the line switch and the packet switch so as to set up another virtual circuit using another switch. However, it takes time for clearing and setting up the current and the other virtual circuits, respectively, so that throughput of the data is also degraded.

SUMMARY OF THE INVENTION

Therefore, it is an object of the present invention to provide an ISDN access system from packet data equipment such as a LAN which enables to change between a virtual circuit using a packet switch in an ISDN switch and another virtual circuit using a line switch in the ISDN switch without interruption of transmission of packet data.

The present invention provides a system for use in access to ISDN (Integrated Services Digital Network) from a packet data equipment. The ISDN comprises an ISDN switch including a line switch and a packet switch, a plurality of subscriber's lines extending from the ISDN switch, each of the subscriber's lines transmitting a TDM (Time Division Multiplex) signal which comprises first and second communication information channels for conveying communication information and a control channel for conveying a control signal for data link establishment and call control. The ISDN access system comprises: switching means having an input port and a first and a second output ports and coupled to the packet data equipment at the input port for switching the input port to one of the first and second output ports by a switching signal, the switching means delivering the packet data signal as a first switched signal to the first output port when the input port is switched to the first output port, the switching means delivering the packet data signal as a second switched signal to the second output port when the input port is switched to the second output port; first gateway means coupled to the first output port for performing protocol conversion of the first switched signal to produce a converted signal; control channel processing means responsive to an enabling signal for producing a control channel signal as a call connection request, the control channel signal having a destination address of a called party, a channel indicator representative of a particular one of the first and second communication information channels to be connected, and a switch indicator representative of a particular one of the packet switch and the line switch which is predetermined corresponding to the particular communication information channel, the control channel processing means producing a connection acknowledge signal after the call connection is completed in the ISDN switch; generating means for generating a channel change signal; control means coupled to the generating means and responsive to the channel change signal for producing the enabling signal, the control means responsive to the connection acknowledge signal for producing the switching signal; and interface means coupled to the first gateway means, the second output port of the switching means, the control channel processing means, and one of the subscriber's lines for delivering the converted signal, the second switched signal, and the control channel signal into the first and the second communication information channels and the control channel in the TDM signal, respectively, which is transmitted to the ISDN switch through the one subscriber's line.

In the ISDN access system, responsive to the enabling signal generated during a time when the packet data signal is transmitted as the converted signal to the ISDN through the first communication information channel and the packet switch, the control channel processing means produces the control channel signal having the destination address, the channel indicator representative of the second communication information channel as the particular communication information channel, and the switch indicator representative of the line switch as the particular switch. The control channel processing means produces the connection acknowledge signal to the control means after the call connection is completed through the second communication information channel and the line switch. The control means responsive to the connection acknowledge signal produces the switching signal. The switching means responsive to the switching signal connects the input port to the second output port to produce the second switched signal. Then, the control channel processing means performs a call release for the first information channel.

In the ISDN access system, responsive to the enabling signal generated during a time when the packet data signal is transmitted as the second switched signal to the ISDN through the second communication information channel and the line switch, the control channel processing means produces the control channel signal having the destination address, the channel indicator representative of the first communication information channel as the particular communication information channel, the switch indicator representative of the packet switch as the particular switch. The control channel processing means produces the connection acknowledge signal to the control means after the call connection is completed through the first communication information channel and the packet switch. The control means responsive to the connection acknowledge signal produces the switching signal. The switching means responsive to the switching signal connects the input port to the first output port to produce the first switched signal. Then, the control channel processing means performs a call release for the first information channel.

Generally, the packet data signal as the first switched signal contains destination address data. The ISDN access system further comprises the first gateway means for deriving the destination address data from the first switched signal, and conversion means coupled to the first gateway means for converting the destination address data into a telephone number corresponding to the destination address data to deliver the telephone number as the destination address to the control channel processing means.

The packet data equipment may comprise a LAN (Local Area Network), and means coupled to the LAN for processing a signal from the LAN into the packet data signal of a predetermined frame format.

In the case, the ISDN access system further comprises the interface means for receiving a TDM signal incoming thereto through the one subscriber's line to separate the incoming TDM signal into the first and the second communication information channel signals and the control channel signals as a first received packet data signal, a second received packet data signal and a received control signal, second gateway means coupled to the interface means and responsive to the first received packet data signal for performing a reversed protocol conversion of the first received packet data signal to produce a second converted signal, and adding means having two input terminals coupled to the second gateway means and the interface means, respectively, for adding the second converted signal and the second received packet data signal to produce a resultant packet data signal which is delivered to the LAN terminal.

DESCRIPTION OF PREFERRED EMBODIMENTS

Figure 1:
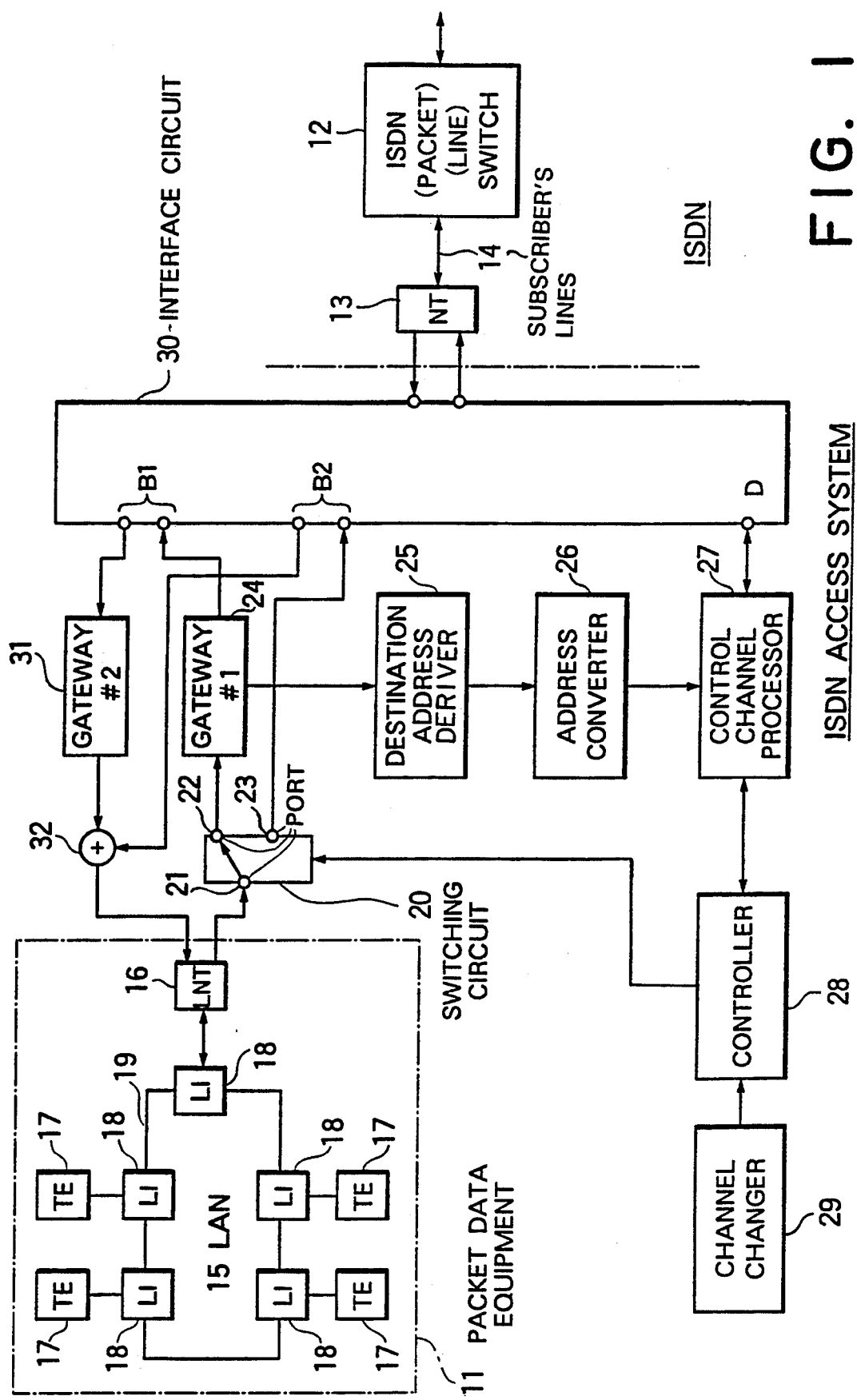
FIG. 1 is a block diagram illustrating an ISDN access system according to one embodiment of the present invention together with a LAN and the ISDN.

Referring to FIG. 1, the ISDN access system is shown therein for access from a packet data equipment 11 to an ISDN including ISDN switch 12 and a network terminal 13 connected to the ISDN switch 12 through a digital subscriber's line 14. The ISDN switch 12 includes a packet switch and a line switch.

The packet data equipment 11 may be any equipment which transmit data packets as packet data sources. The packet data equipment may be equipment which can receive data packets as well as transmit data packets. In the illustrated embodiment, the packet data equipment 11 is shown as a LAN 15 and a LAN terminal (LNT) 16 connected to the LAN 15.

The LAN 15 comprises a plurality of terminal equipments (TE) 17 connected to LAN interfaces (LI) 18 which are connected in series by a bus to form a loop 19. One of LAN interfaces 18 is connected to the LAN terminal 16. The LAN terminal 16 is a network terminal of the LAN 15 and is for processing a packet data signal from the LAN interface 18 into another packet data signal having a frame and a transmission rate according to a D channel protocol used in the ISDN.

Figure 2:
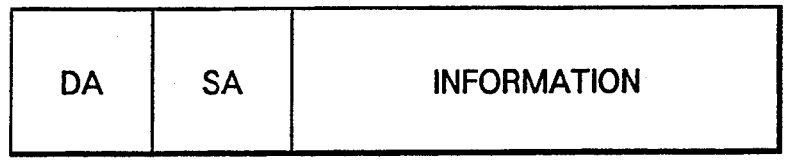
FIG. 2 is a view illustrating an essential part of a data packet frame format.

Referring to FIG. 2, an essential part of those packet data signals from the LAN interface 18 and the LAN terminal 16 comprises a destination address DA, a source address SA, and information to be transferred from the destination address to the source address.

Returning to FIG. 1, the ISDN access system comprises a switching circuit 20 having an input port 21 and a first and a second output port 22 and 23. The input port 21 is connected to the packet data equipment 11, in detail, to the LAN terminal 16 for receiving the packet data signal therefrom. The input port 21 is selectively connected or switched to one of the first and the second output ports 22 and 23 by switching circuit 20. The switch connection of the switching circuit 20 is selected by a switching signal. Accordingly, the switching circuit 20 delivers the packet data signal as a first switched signal to the first output port 22 when the input port 21 is connected to the first output port 22. On the other hand, the switching circuit 20 delivers the packet data signal as a second switched signal to the second output port 23 when the input port 21 is connected to the second output port 23.

A first gateway circuit (GATEWAY #1) 24 is coupled to the first output port 22 and is for performing protocol conversion of the first switched signal to produce a converted signal.

The ISDN uses a packet level protocol according to CCITT recommendation X.25. Therefore, the gateway circuit 24 performs the protocol conversion of the packet data as the first switched signal from the LAN protocol to the protocol according to the CCITT recommendation X.25.

A destination address deriver 25 is connected to the first gateway circuit 24 and receives the converted signal. The destination address deriver 25 derives the destination address as a derived address from the packet data signal as the converted signal.

An address converter 26 is connected to the destination address deriver 25 and receives the destination address as the derived address. The address converter 26 converts the derived address into a corresponding subscriber's address or a telephone number of a called party.

Figure 3:
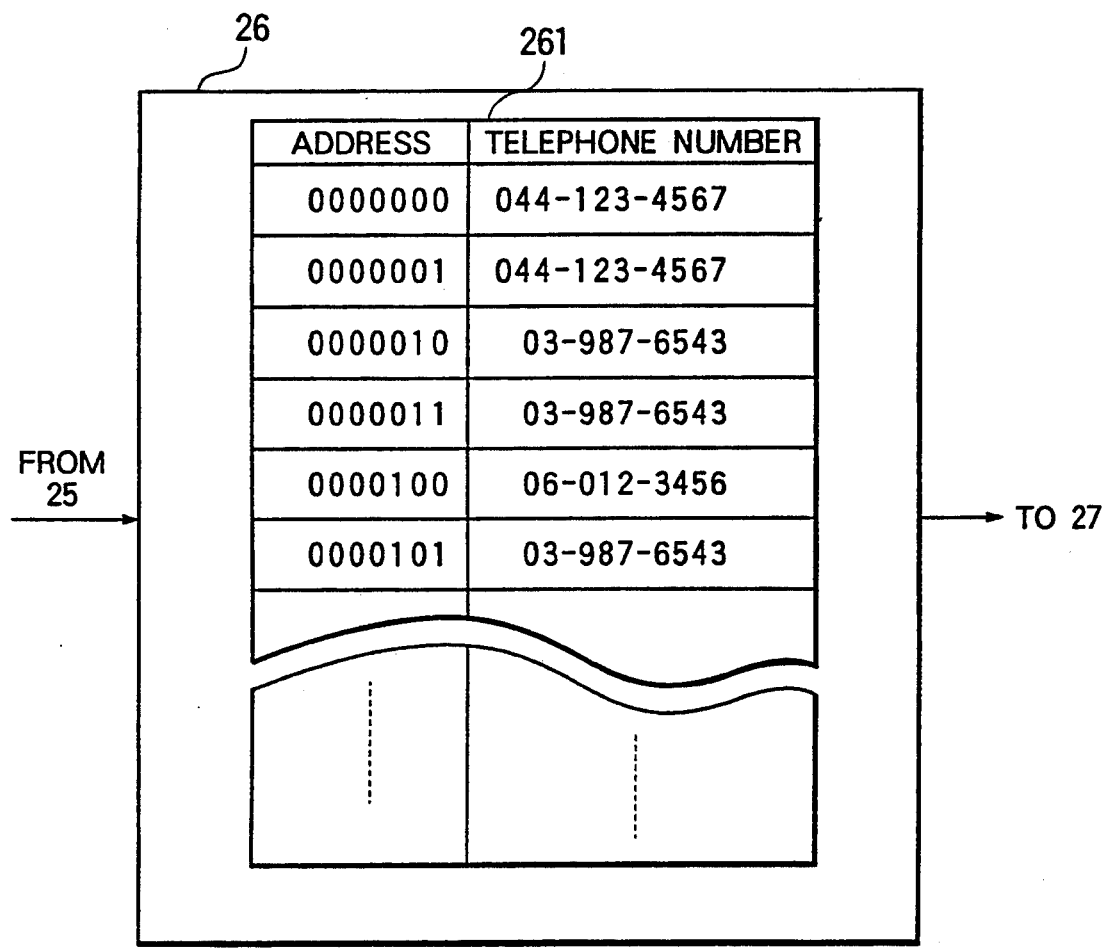
FIG. 3 is a view illustrating a conversion list in an address converter in FIG. 1.

Turning to FIG. 3, the address converter 26 comprises a conversion list 261 for converting destination addresses into corresponding telephone numbers. When a called party has a plurality of terminal equipments, destination addresses of the plurality of terminal equipments are converted into a single telephone number of the called party.

Referring to FIG. 1 again, a control channel processor 27 is connected to the address converter 26 and a controller 28 and receives the telephone number of the called party and an enabling signal. In response to the enabling signal from the controller 28, the control channel processor 27 starts the D channel protocol for data link establishment and call control according to layers 2 and 3 of CCITT recommendation Q.921 and Q931. In detail, the control channel processor 27 generates a D channel signal of a frame format of LAPD (Link Access Procedure on D channel) in which messages for call control are carried. The message includes the telephone number of the called party, a channel indicator representative of a particular one of the B1 and B2 channels, and a switch indicator representative of one of the packet switch and the line switch.

According to the present invention, it is predetermined that B1 and B2 channels correspond to packet switch and the line switch, respectively. Therefore, when the channel indicator is representative of the B1 channel in a single call control, the switch indicator is representative of the packet switch in the call control. On the other hand, when the channel indicator is representative of the B2 channel in a single call control, the switch indicator is representative of the line switch in the call control.

The control channel processor 27 produces a connection acknowledgment signal after a call connection is completed in the ISDN switch 12.

A channel changer 29 is for producing a trigger signal as a channel change signal.

The controller 28 connected to the channel changer 29. When the controller 28 receives the channel change signal, it produces the enabling signal to start the control channel processor 27. When the controller 28 receives the connection acknowledgment signal from the control channel processor 27, it produces the switching signal.

An interface circuit 30 is coupled to the first gateway circuit 24, the second output port 23, the control channel processor 27, and the network terminal 13. The interface circuit 30 receives the converted signal from the first gateway circuit 24, the second switched signal from the second output port 23 and the control channel signal from the control channel processor 27 and delivers them into the B1 and the B2 channels and the D channel, respectively, in the TDM signal which is transmitted to the ISDN switch 12 through the network terminal 13.

Now, referring to FIGS. 4 and 5, description will be made as regards operation of the system shown in FIG. 1.

Figure 4:
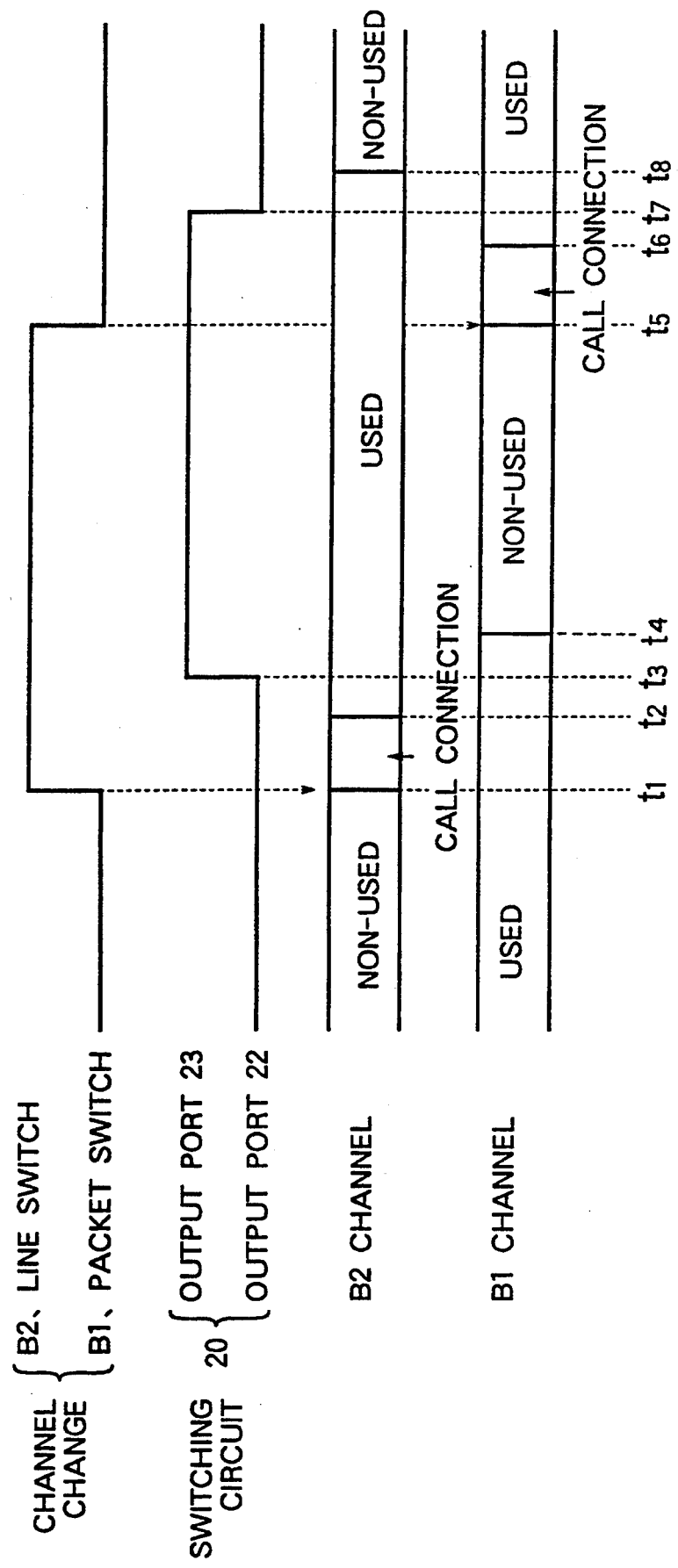
FIG. 4 is a time chart illustrating operation of various portions in FIG. 1.

During a time when transmission of data packets is performed through the B1 channel and the packet switch, the controller 28 produces the enabling signal when the channel changer 29 produces the channel change signal at time $t_1$ as shown in FIG. 4. In response to the enabling signal, the control channel processor 27 produces the control channel signal having the telephone number of the called party, the channel indicator representative of the B2 channel and the switch indicator representative of the line switch so as to perform call connection for B2 channel (steps S1–S3 in FIG. 5).

Figure 5:
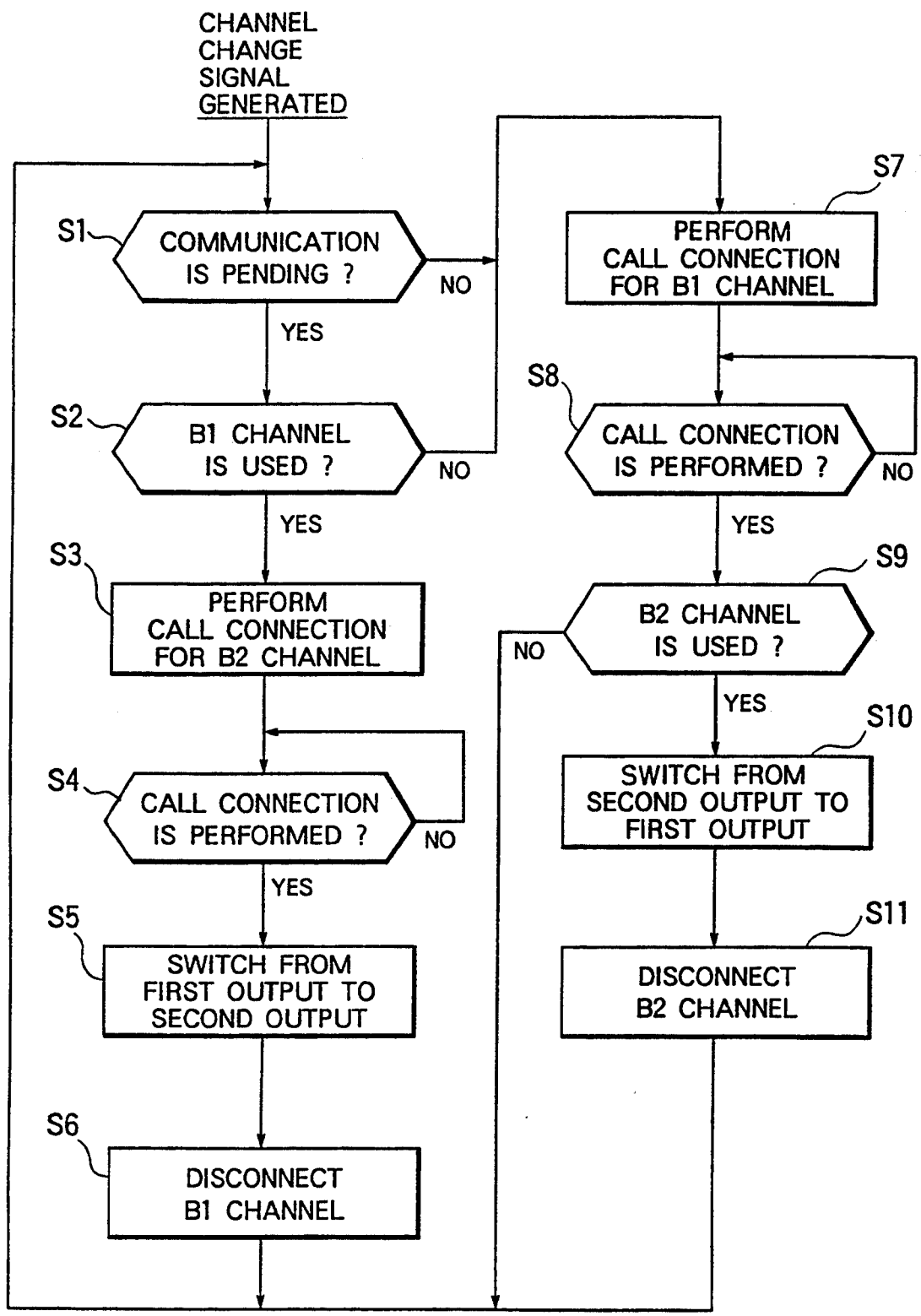
FIG. 5 is a flow chart illustrating operation of a controller and a control channel processor in FIG. 1.

When the call connection is performed at time $t_2$, the control channel processor 27 produces the connection acknowledge signal (step S4, FIG. 5). In response to the connection acknowledge signal, the controller 28 produces the switching signal so that the switching circuit 20 switches the input port from the first output port 22 to the second output port 23 at time $t_3$ (step S5, FIG. 5). As a result, the packet data signal is delivered as the second switched signal to the interface circuit 30 and then transmitted in the B2 channel to the line switch in the ISDN switch 12. Thereafter, the control channel processor 27 performs disconnection of the virtual circuit on B1 channel at time $t_4$ (step S6, FIG. 5).

Thereafter, when the channel changer 29 produces the channel change signal at time $t_5$, the controller 28 produces the enabling signal. In response to the enabling signal, the control channel processor 27 produces the control channel signal having the telephone number of the called party, the channel indicator representative of the B1 channel and the switch indicator representative of the packet switch so as to perform call connection for B2 channel (steps S1, S2 and S7 in FIG. 5).

When the call connection is performed at time $t_6$, the control channel processor 27 produces the connection acknowledge signal (step S8, FIG. 5). In response to the connection acknowledge signal, the controller 28 produces the switching signal so that the switching circuit 20 switches the input port from the second output port 23 to the first output port 22 at time $t_7$ (step S9, FIG. 5). As a result, the packet data signal is delivered as the first switched signal to the interface circuit 30 through the first gateway circuit 24 and then transmitted in the B1 channel to the packet switch in the ISDN switch 12. Thereafter, the control channel processor 27 performs disconnection of the virtual circuit on B2 channel at time $t_8$ (step S11, FIG. 5).

When the ISDN access system in FIG. 1 is in a waiting time, the switching circuit 20 is in a reset condition where the input port 21 is connected to the first output port 22. When a call request is originated from the packet data equipment 11 and the channel change signal as the trigger is generated from the channel changer 29, the packet data signal from the packet data equipment 11 is delivered as the first switched signal to the first gateway circuit 24. The first gateway circuit 24 connects the first switched signal to the converted signal which is, in turn, connected to the interface circuit 30 and the destination address deriver 25. The address deriver 25 deriver the destination address from the converted signal. The address converter 26 converts the destination address into the telephone number of the called party, which is delivered to the control channel processor 27.

The control channel processor 27 produces the control channel signal having the telephone number, the channel indicator representative of B1 channel, and the switch indicator representative of the packet switch so as to perform the call connection on B1 channel (steps S1 and S7, FIG. 5). The control channel processor 27 produces the connection acknowledgment after the virtual circuit is made on B1 channel through the packet switch (step S8, FIG. 5). Thus, the packet data signal is transmitted to the destination address through the virtual circuit using B1 channel and the packet switch.

In order to transfer the packet data signal transmitted through the ISDN from another subscriber to the packet data equipment 11, the ISDN access system of FIG. 1 further comprises a second gateway circuit (GATEWAY #2) 31 and an adder 32.

The interface circuit 30 receives the TDM signal incoming thereto through the network terminal 13 and demultiplex the TDM signal into the B1 and B2 channel signals and the D channel signals which are separately delivered to the second gateway circuit 31, the adder 32 and the control channel processor 27, respectively.

The control channel processor 27 performs the call control in response to the D channel signal.

The second gateway circuit 31 produces the reversed protocol conversion of the B1 channel signal to produce a second coverted signal. The second converted signal is applied to the adder 32. The adder 32 adds the B2 channel signal and the second converted signal to produce a resultant signal. The resultant signal is delivered to the packet data equipment 11. Thus, even if the packet data signal is transferred through any one of B1 and B2 channels, it is transferred to the packet data equipment.

What is claimed is:

1. A system for use in access to ISDN (Integrated Service Digital Network) from a packet data equipment for producing a packet data signal to be transmitted, said ISDN comprising an ISDN switch including a line switch and a packet switch, a plurality of subscriber's lines extending from said ISDN switch, each of said subscriber's lines transmitting a TDM (Time Division Multiplex) signal which comprises first and second communication information channels for conveying communication information and a control channel for conveying a control signal for data link establishment and call control, said system comprising:

switching means having an input port and first and second output ports and coupled to said packet data equipment at said input port for switching said input port to one of said first and second output ports by a switching signal, said switching means receiving said packet data signal through said input port from said packet data equipment without interruption and delivering said packet data signal as a first switched signal to said first output port when said input port is switched to said first output port, said switching means delivering said packet data signal as a second switched signal to said second output port when said input port is switched to said second output port;

first gateway means coupled to said first output port for performing protocol conversion of said first switched signal to produce a converted signal;

control channel processing means responsive to an enabling signal for producing a control channel signal as a call connection requires, said control channel signal having a destination address of a called party, a channel indicator representative of a particular channel, said particular channel being one of said first and second communication information channels to be connected, and a switch indicator representative of a particular one of said packet switch and said line switch which is predetermined corresponding to said particular channel, said control channel processing means producing a connection acknowledge signal after said call connection is completed in said ISDN switch;

generating means for generating a channel change signal;

control means coupled to said generating means and responsive to said channel change signal for producing said enabling signal, said control means responsive to said connection acknowledge signal for producing switching signal; and interface means coupled to said first gateway means, said second output port of said switching means, said control channel processing means, and a specific line, said specific line being one of said subscriber's lines, said interface means delivering said converted signal into said first communication information channel when said switching means switches said input port to said first output port, and delivering, said second switched signal into said second communication information channel when said switching means switches said input port to said second output port and delivering said control channel signal into said control channel, respectively, which is transmitted to said ISDN switch through said specific line.

2. A system as claimed in claim 1, wherein, responsive to said enabling signal generated during a time when said packet data signal is transmitted as said converted signal to said ISDN through said first communication information channel and said packet switch, said control channel processing means produces said control channel signal having said destination address, said channel indicator representative of said second communication information channel, and said switch indicator representative of said line switch, said control channel processing means producing said connection acknowledge signal to said control means after the call connection is completed through said second communication information channel and said line switch, said control means responsive to said connection acknowledge signal producing said switching signal, said switching means responsive to said switching signal connecting said input port to said second output port to produce said second switched signal, then the control channel processing means performing a call release for said first communication information channel.

3. A system as claimed in claim 1, wherein, responsive to said enabling signal generated during a time when said packet data signal is transmitted as said second switched signal to said ISDN through said second communication information channel and said line switch, said control channel processing means produces said control channel signal having said destination address, said channel indicator representative of said first communication information channel as said particular communication information channel, said switch indicator representative of said packet switch as said particular switch, said control channel processing means producing said connection acknowledge signal to said control means after the call connection is completed through said first communication information channel and said packet switch, said control means responsive to said connection acknowledge signal producing said switching signal, said switching means responsive to said switching signal connecting said input port to said first output port to produce said first switched signal, then the control channel processing means performing a call release for said first communication information channel.

4. A system as claimed in claim 1, said packet data signal as said first switched signal containing destination address data, which further comprises said first gateway means coupled to means for deriving said destination address data from said first switched signal, and conversion means coupled to said first gateway means for converting said destination address data into a telephone number corresponding to the destination address data to deliver said telephone number as said destination address to said control channel processing means.

5. A system as claimed in claim 4, said packet data equipment comprising a LAN (Local Area Network), and means coupled to said LAN for processing a signal from said LAN into said packet data signal of a predetermined frame format.

6. A system as claimed in claim 5, which further comprises said interface means for receiving a TDM signal incoming thereto through one of said subscriber's line to separate the incoming TDM signal into the first and the second communication information channel signals and the control channel signals as a first received packet data signal, a second received packet data signal and a received control signal, second gateway means coupled to said interface means and responsive to said first received packet data signal for performing a reversed protocol conversion of said first received packet data signal to produce a second converted signal, and adding means having two input terminals coupled to said second gateway means and said interface means, respectively, for adding said second converted signal and said second received packet data signal to produce a resultant packet data signal which is delivered to a LAN terminal.

7. A system as claimed in claim 6, wherein said one of said subscriber's line is said specific line.

* * * * *

UNITED STATES PATENT AND TRADEMARK OFFICE
CERTIFICATE OF CORRECTION

PATENT NO. : 5,347,516
DATED : September 13, 1994
INVENTOR(S) : Atsushi Yoshida

It is certified that error appears in the above-indentified patent and that said Letters Patent is hereby corrected as shown below:

On the title page, under item [30], Foreign Application Priority Data, change "Apr. 14, 1991" to --Apr. 15, 1991--.

Signed and Sealed this

Sixth Day of December, 1994

Attest:

BRUCE LEHMAN

*Attesting Officer*     *Commissioner of Patents and Trademarks*